United States Patent [19]
Brockmann et al.

[11] Patent Number: 5,293,607
[45] Date of Patent: Mar. 8, 1994

[54] FLEXIBLE N-WAY MEMORY INTERLEAVING

[75] Inventors: Russell C. Brockmann; William S. Jaffe, both of Fort Collins, Colo.; William R. Bryg, Saratoga, Calif.

[73] Assignee: Hewlett-Packard Company, Palo Alto, Calif.

[21] Appl. No.: 679,868

[22] Filed: Apr. 3, 1991

[51] Int. Cl.$^5$ .................... G06F 12/00; G06F 12/06; G06F 13/00
[52] U.S. Cl. .................... 395/425; 395/400; 364/DIG. 1; 364/246.4; 364/254.3; 364/255.1; 364/259.8
[58] Field of Search ............... 395/400, 425; 364/200 MS File, 900 MS File, 246.4, 746

[56] References Cited

U.S. PATENT DOCUMENTS

| | | | |
|---|---|---|---|
| 3,980,874 | 9/1976 | Vora | 364/746 |
| 4,189,767 | 2/1980 | Ahuja | 364/200 |
| 4,254,463 | 3/1981 | Busby et al. | 395/400 |
| 4,584,562 | 4/1986 | Bernardson | 364/746 |
| 4,598,266 | 7/1986 | Bernardson | 364/746 |
| 4,722,067 | 1/1988 | Williams | 364/746 |
| 4,949,293 | 8/1990 | Kawamura et al. | 364/746 |
| 4,994,994 | 2/1991 | Burgess et al. | 364/746 |
| 5,111,389 | 5/1992 | McAuliffe et al. | 395/800 |
| 5,119,486 | 6/1992 | Albonesi | 395/425 |

FOREIGN PATENT DOCUMENTS

WO-A-9004576  5/1990  PCT Int'l Appl. .

OTHER PUBLICATIONS

Fred J. Taylor, "Residue Arithmetic: A Tutorial with Examples," 1984, pp. 50–62.

IBM Technical Disclosure Bulletin, "Programmable Variable Memory Configuration Control," vol. 32, No. 7, Dec. 1989, pp. 212–213.

*Primary Examiner*—Joseph L. Dixon
*Assistant Examiner*—Frank J. Asta

[57] ABSTRACT

The invention comprises methods and apparatuses for interleaving a number of memory cards of different sizes. A restricted range modulo-N adder for identifying and selecting the correct interleave card is provided. Another aspect of the invention provides a computer system with flexible memory interleaving capability.

9 Claims, 3 Drawing Sheets

FLEXIBLE N-WAY MEMORY INTERLEAVING

FIELD OF THE INVENTION

The present invention relates generally to the field of memory addressing. More particularly, the invention relates to a method and apparatus for carrying out block memory addressing in an interleaved fashion, with a variety of block sizes.

BACKGROUND OF THE INVENTION

Computers and computer systems typically have two busses, an address bus and a data bus. The address bus, used for addressing and control, is usually of a fixed width, and carries the necessary signals to initiate transactions between the computer's internal memory and peripheral devices. Data is typically transferred over the data bus. In some cases the address bus and data bus are multiplexed for transferring addresses and data.

It is often desirable to organize the computer's storage area into interleaved blocks or cards of memory. Interleaved memory can allow two or more memory blocks to be accessed at a fraction of a cycle apart, thereby significantly reducing cycle time and improving memory speed. The simplest interleave procedure assigns sequential line addresses within a group or list of addresses to sequentially numbered memory blocks. However, this typically requires a large "modulo arithmetic" operation to determine the block number for a given address.

Modulo arithmetic is most easily understood as a remainder function. For instance, 21 divided by 4 equals 5 plus a remainder of 1. Therefore, 21 modulo-5 equals 1. Since, as is well known, division is expensive to implement, modulo arithmetic can be carried out by a repetitive subtraction method whereby the modulus (5 in the preceding example) is repetitively subtracted from the original number (21 in the preceding example) until the result is less than the modulus. For example, 21 modulo-5 is computed as follows:

```
21 − 5 = 16  (> = 5, continue)
16 − 5 = 11  (> = 5, continue)
11 − 5 = 6   (> = 5, continue)
 6 − 5 = 1   (< 5, stop; result is 1)
```

A system having memory organized as 3 blocks of 256 Kbytes each would need a calculation of 256K modulo-3 addresses, which would be difficult in hardware designed for an arbitrary number of N blocks. The easiest simplification is to allow only values of N (the modulus) which are powers of 2, so that the modulo-N operation simply involves extracting a bit field. This method, however, is too inflexible, particularly when adding incremental memory.

An alternative to the above "bit shift" interleave method, for interleaving a power of 2 memory cards, employs an address bit to activate the cards. For example, consider a typical, non-interleaved, byte-addressed system. Assume each memory card supplies 32 bits (4 bytes) per access. Assume further that the address space is 20 bits, and that memory cards are each 64 Kbytes. The address space may then be arranged as follows:

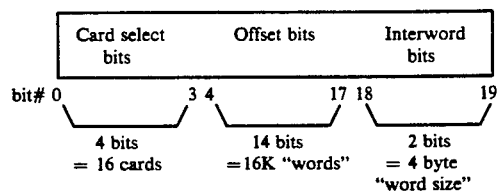

To modify this arrangement to allow interleaving of 2 memory cards, the offset bits are shifted one bit to the left and the LSB (bit 17) of the original offset bits is used as a fourth card select bit, or an interleave bit.

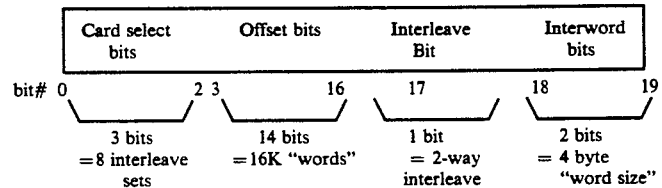

This method and variations of it are in common use. It can be extended easily for systems with memory blocks in powers of 2. However, this method, like the above bit shift method, is too inflexible when adding incremental memory.

The foregoing discussion reflects the fact that, to reduce the complexity of the interleaving circuitry, known interleaving systems require memory blocks to be present in powers of two, e.g., 2, 4, 8, etc. In such systems, six banks of memory, for example, would have to be organized as a bank of two and a bank of four, or three banks of two interleaved memory systems. Due to the heretofore relative complexity of the circuitry for carrying out the interleaving, an arbitrary number of banks has not been practical in the prior art. Nonetheless, there are advantages in being able to interleave an arbitrary, non-power of 2, number of memory banks, e.g., when adding memory to the system.

Accordingly, an object of the present invention is to provide a practical system for carrying out memory interleaving with an arbitrary number of memory blocks. A further object of the present invention is to provide a method and corresponding apparatus whereby the memory blocks can be connected to the address bus and a block identification number provided which the respective blocks can use to select themselves. The present invention achieves these goals.

SUMMARY OF THE INVENTION

One embodiment of the invention provides a method of interleaving a plurality of N memory blocks, each of the N blocks being of a size S (bytes). According to the invention, M-bit data addresses are translated into corresponding addresses of interleaved memory blocks, each block having S bytes grouped into lines of size L (bytes).

The method comprises the steps of, first, identifying a first group of bits ($B\_bits$) of an address being translated, and then identifying a second group of bits ($I\_$ bits) defining an interleave index corresponding to the address being translated. In a preferred embodiment, B_bits and I_bits are determined by computing the values: $A = \log_2(S)$, $B = M - A$, and $I = \text{truncate}(\log_2(N))$. B_bits is then defined as the B MSBs of the address being translated. The A LSBs ("A_bits") of the address being translated are then identified. I_bits is then defined as the I LSBs of A_bits after first stripping away the $\log_2(L)$ LSBs of A_bits. Accordingly A_bits defines an offset within the block defined by B_bits.

Next, an "unadjusted sum" ("SUM") and an adjusted sum ("ADJ_SUM") are computed in accordance with the following definitions: SUM = B_bits + I_bits, and ADJ_SUM = B_bits + I_bits − N.

Finally, a block number corresponding to the address being translated is defined, the block number being a function of at least one of the values of SUM or ADJ_SUM. In a preferred embodiment, the block number selected is the value of SUM when ADJ_SUM is less than zero, and the value of ADJ_SUM when ADJ_SUM is greater than or equal to zero.

Another embodiment of the invention provides a restricted range modulo-N adder for summing first and second input values and computing a result within a range of 0 to N−1, the actual sum of the input values being within the range of 0 to 2N−1. The restricted range modulo-N adder according to the invention comprises means for computing a first sum of the first and second input values, means for computing a second sum of the first and second input values and subtracting a third input value corresponding to N, and means for testing whether the second sum is negative and for selecting the result from one of the first and second sums, the selection being of the first sum when the second sum is less than zero, and the selection being of the second sum when the second sum is greater than or equal to zero.

Another embodiment of the invention provides a digital system comprising a computer, N memory blocks coupled to the computer, and addressing means for reading/writing data values from/to the memory in an interleaved fashion. The addressing means comprises means for carrying out the method described above, including the restricted range modulo-N adder.

DETAILED DESCRIPTION OF THE PREFERRED EMBODIMENTS

Figure 1:
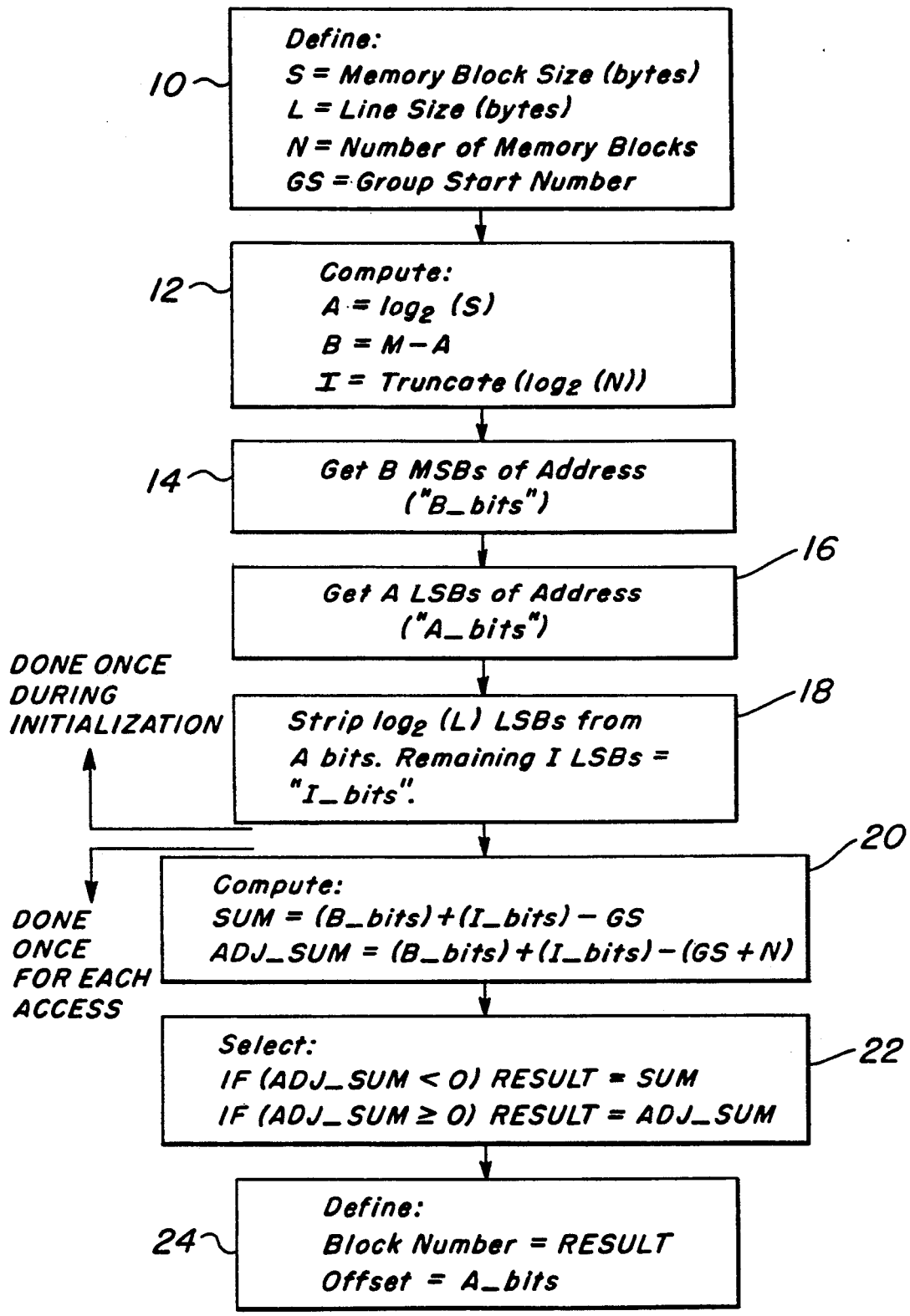
FIG. 1 is a simplified flowchart of a method of translating memory addresses into corresponding interleaved block addresses, in accordance with the present invention.

The preferred embodiments of the invention include a method and corresponding apparatus for translating the respective addresses of memory locations into corresponding interleaved block addresses and offsets within each block, and a computer system comprising interleaved memory blocks. These embodiments are described below with reference to the drawings, wherein like reference characters designate like elements or steps.

To provide an overview, it is noted that the preferred method employs a restricted range modulo-N adder (described below) to add the upper address bits that are unused by the memory blocks, referred to herein as the "B_bits," to the I least significant line address bits, referred to herein as the "I_bits." In this discussion, I and B represent integers, and "B_bits" and "I_bits" represent a particular grouping or subset of neighboring address bits. In addition, a "line" refers to the group of bytes (typically 16 or 32 in a cache-based system) transferred with each memory access. A "line address" is the address of the first byte in a particular line. According to the invention, the sum of B_bits and I_bits (referred to as the "unadjusted sum") is computed in parallel with the sum of B_bits and I_bits − N, N being the number of blocks being interleaved. To allow for several groups of interleaved blocks, the beginning address of the group (denominated "GS" herein, for Group Start) is also subtracted from B_bits. If the blocks are not organized into groups, GS would be set to zero. Thus, the "adjusted sum" of B_bits and I_bits − (GS+N) is computed. These sums may be computed by three-term adders, one term of which is a predefined constant determined during system configuration (the predefined constant is −GS and −(GS+N) for the respective adders). Design and implementation of the three term adders is well known in the art.

According to the invention, either the adjusted sum or unadjusted sum is used to define a block number identifying a particular memory block corresponding to the address being translated. The determination of whether the adjusted sum or unadjusted sum is used is based upon whether the adjusted sum is negative, zero or positive. These sums, as well as the selection of which of them is used to select the corresponding memory blocks, are carried out by a restricted range modulo-N adder in accordance with the present invention.

The method is described next, with reference to FIG. 1. The restricted range modulo-N adder is then described with reference to FIG. 2. Finally, a computer system incorporating the invention is described with reference to FIG. 3.

Referring now to FIG. 1, the first operation, step 10, is to define the parameters "S," "L," "N" and "GS". S represents the size, in bytes, of a memory block in a particular group. (Within a group all blocks are required to be of the same size.) L represents the size, in bytes, of a line in a block. As mentioned above, N and GS represent the number of blocks in a particular group and the particular group's starting address number, respectively.

The next step is to compute the values of the variables "A", "B" and "I", step 12. These variables are defined as follows:

$A = \log_2(S)$, $B = M - A$, and $I = \text{truncate } (\log_2(N))$, where "M" is equal to the width (i.e., number of bits) of the address bus of the system, which is a predefined constant.

Steps 14, 16 and 18 involve the identification of "B_bits," "A_bits" and I_bits," respectively. B_bits is defined by the B most significant bits (MSBs) of the address being translated; A_bits is defined by the A remaining least significant bits (LSBs) of the address;

and I_bits is defined by the I LSBs of the line address, the line address being defined by the remaining bits of A_bits after stripping away the bits necessary to identify a particular byte within a line. Thus, for a line size of L, I_bits is defined by the I LSBs remaining of A_bits after stripping away the $\log_2(L)$ LSBs of A_bits.

For example, consider 5 blocks (N=5) of 1024 byte memory (S=1024), with a line size of 16 bytes (L=16) and a 16-bit address bus (M=16). Assume further that the group start address (GS) is zero. The number of bits A required to address all locations within a memory block is $A = \log_2(1024) = 10$. B is therefore $16-10=6$, and I is truncate($\log_2(5)$)=2. The interleave bits (I_bits) are bits 10 and 11, with bit zero being the left most bit of the address. The address, then, is broken up as follows:

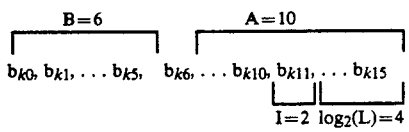

Note that the subscripts (e.g., k0, k1, k2, etc.) are used to indicate a particular address and bit number; e.g., bit 0 of the kth address in a list of addresses would be represented as $b_{k0}$. Thus, in this example, I_bits, A_bits and B_bits corresponding to a particular address are defined as follows (dropping the subscript k):

I_bits = $(b_{10}, b_{11})$,

A_bits = $(b_6, b_7, \ldots b_{15})$, and

B_bits = $(b_0, b_1, \ldots b_5)$.

Note that the above steps 10-18 need only be performed once, during system configuration (startup). The following steps 20-24 are performed with each memory access.

Turning again to FIG. 1, the unadjusted sum ("SUM") and adjusted sum ("ADJ_SUM") are computed next (with each access), preferably at the same time, step 20. These sums are computed as follows:

$SUM = B\_bits + I\_bits - GS$ $ADJ\_SUM = B\_bits + I\_bits - (GS + N).$

Next, step 22, the adjusted sum (ADJ_SUM) is selected as the correct result (RESULT) if it is greater than or equal to zero. If not, the unadjusted sum (SUM) is selected as the correct result.

The last step, step 24, is to define the block number and offset corresponding to the address being translated. The block number is simply set equal to RESULT, and the offset address is defined by A_bits.

As a further example of the above-described method, the following table shows a list of internal addresses and corresponding translated external bus addresses, the bus addresses comprising a block number ("blk" in the table) and offset address ("offset" in the table). In the example, S=32, N=7, I=2, M=7, A=4, B=3 and GS=0.

| | Address | | | | Bus Address | |
|---|---|---|---|---|---|---|
| B_bits | xx | I_bits | ADJ − SUM | SUM | blk | offset |
| 000 | 00 | 00 | −7 | 0 | 000 | 0000 |
| 000 | 00 | 01 | −6 | 1 | 001 | 0001 |
| 000 | 00 | 10 | −5 | 2 | 010 | 0010 |
| 000 | 00 | 11 | −4 | 3 | 011 | 0011 |
| 000 | 01 | 00 | −7 | 0 | 000 | 0100 |
| 000 | 01 | 01 | −6 | 1 | 001 | 0101 |
| 000 | 01 | 10 | −5 | 2 | 010 | 0110 |
| 000 | 01 | 11 | −4 | 3 | 011 | 0111 |
| 000 | 10 | 00 | −7 | 0 | 000 | 1000 |
| 000 | 10 | 01 | −6 | 1 | 001 | 1001 |
| 000 | 10 | 10 | −5 | 2 | 010 | 1010 |
| 000 | 10 | 11 | −4 | 3 | 011 | 1011 |
| 000 | 11 | 00 | −7 | 0 | 000 | 1100 |
| 000 | 11 | 01 | −6 | 1 | 001 | 1101 |
| 000 | 11 | 10 | −5 | 2 | 010 | 1110 |
| 000 | 11 | 11 | −4 | 3 | 011 | 1111 |
| 001 | 00 | 00 | −6 | 1 | 001 | 0000 |
| 001 | 00 | 01 | −5 | 2 | 010 | 0001 |
| 001 | 00 | 10 | −4 | 3 | 011 | 0010 |
| 001 | 00 | 11 | −3 | 4 | 100 | 0011 |
| 001 | 01 | 00 | −6 | 1 | 001 | 0100 |
| 001 | 01 | 01 | −5 | 2 | 010 | 0101 |
| 001 | 01 | 10 | −4 | 3 | 011 | 0110 |
| 001 | 01 | 11 | −3 | 4 | 100 | 0111 |
| 001 | 10 | 00 | −6 | 1 | 001 | 1000 |
| 001 | 10 | 01 | −5 | 2 | 010 | 1001 |
| 001 | 10 | 10 | −4 | 3 | 011 | 1010 |
| 001 | 10 | 11 | −3 | 4 | 100 | 1011 |
| 001 | 11 | 00 | −6 | 1 | 001 | 1100 |
| 001 | 11 | 01 | −5 | 2 | 010 | 1101 |
| 001 | 11 | 10 | −4 | 3 | 011 | 1110 |
| 001 | 11 | 11 | −3 | 4 | 100 | 1111 |
| 010 | 00 | 00 | −5 | 2 | 010 | 0000 |
| 010 | 00 | 01 | −4 | 3 | 011 | 0001 |
| 010 | 00 | 10 | −3 | 4 | 100 | 0010 |
| 010 | 00 | 11 | −2 | 5 | 101 | 0011 |
| 010 | 01 | 00 | −5 | 2 | 010 | 0100 |
| 010 | 01 | 01 | −4 | 3 | 011 | 0101 |
| 010 | 01 | 10 | −3 | 4 | 100 | 0110 |
| 010 | 01 | 11 | −2 | 5 | 101 | 0111 |
| 010 | 10 | 00 | −5 | 2 | 010 | 1000 |
| 010 | 10 | 01 | −4 | 3 | 011 | 1001 |
| 010 | 10 | 10 | −3 | 4 | 100 | 1010 |
| 010 | 10 | 11 | −2 | 5 | 101 | 1011 |
| 010 | 11 | 00 | −5 | 2 | 010 | 1100 |
| 010 | 11 | 01 | −4 | 3 | 011 | 1101 |
| 010 | 11 | 10 | −3 | 4 | 100 | 1110 |
| 010 | 11 | 11 | −2 | 5 | 101 | 1111 |
| 011 | 00 | 00 | −4 | 3 | 011 | 0000 |
| 011 | 00 | 01 | −3 | 4 | 100 | 0001 |
| 011 | 00 | 10 | −2 | 5 | 101 | 0010 |
| 011 | 00 | 11 | −1 | 6 | 110 | 0011 |
| 011 | 01 | 00 | −4 | 3 | 011 | 0100 |
| 011 | 01 | 01 | −3 | 4 | 100 | 0101 |
| 011 | 01 | 10 | −2 | 5 | 101 | 0110 |
| 011 | 01 | 11 | −1 | 6 | 110 | 0111 |
| 011 | 10 | 00 | −4 | 3 | 011 | 1000 |
| 011 | 10 | 01 | −3 | 4 | 100 | 1001 |
| 011 | 10 | 10 | −2 | 5 | 101 | 1010 |
| 011 | 10 | 11 | −1 | 6 | 110 | 1011 |
| 011 | 11 | 00 | −4 | 3 | 011 | 1100 |
| 011 | 11 | 01 | −3 | 4 | 100 | 1101 |
| 011 | 11 | 10 | −2 | 5 | 101 | 1110 |
| 011 | 11 | 11 | −1 | 6 | 110 | 1111 |
| 100 | 00 | 00 | −3 | 4 | 100 | 0000 |
| 100 | 00 | 01 | −2 | 5 | 101 | 0001 |
| 100 | 00 | 10 | −1 | 6 | 110 | 0010 |
| 100 | 00 | 11 | 0 | 7 | 000 | 0011 |
| 100 | 01 | 00 | −3 | 4 | 100 | 0100 |
| 100 | 01 | 01 | −2 | 5 | 101 | 0101 |
| 100 | 01 | 10 | −1 | 6 | 110 | 0110 |
| 100 | 01 | 11 | 0 | 7 | 000 | 0111 |
| 100 | 10 | 00 | −3 | 4 | 100 | 1000 |
| 100 | 10 | 01 | −2 | 5 | 101 | 1001 |
| 100 | 10 | 10 | −1 | 6 | 110 | 1010 |
| 100 | 10 | 11 | 0 | 7 | 000 | 1011 |
| 100 | 11 | 00 | −3 | 4 | 100 | 1100 |
| 100 | 11 | 01 | −2 | 5 | 101 | 1101 |
| 100 | 11 | 10 | −1 | 6 | 110 | 1110 |

-continued

| Address | | | | | Bus Address | |
|---|---|---|---|---|---|---|
| B_bits | xx | I_bits | ADJ − SUM | SUM | blk | offset |
| 100 | 11 | 11 | 0 | 7 | 000 | 1111 |
| 101 | 00 | 00 | −2 | 5 | 101 | 0000 |
| 101 | 00 | 01 | −1 | 6 | 110 | 0001 |
| 101 | 00 | 10 | 0 | 7 | 000 | 0010 |
| 101 | 00 | 11 | 1 | 8 | 001 | 0011 |
| 101 | 01 | 00 | −2 | 5 | 101 | 0100 |
| 101 | 01 | 01 | −1 | 6 | 110 | 0101 |
| 101 | 01 | 10 | 0 | 7 | 000 | 0110 |
| 101 | 01 | 11 | 1 | 8 | 001 | 0111 |
| 101 | 10 | 00 | −2 | 5 | 101 | 1000 |
| 101 | 10 | 01 | −1 | 6 | 110 | 1001 |
| 101 | 10 | 10 | 0 | 7 | 000 | 1010 |
| 101 | 10 | 11 | 1 | 8 | 001 | 1011 |
| 101 | 11 | 00 | −2 | 5 | 101 | 1100 |
| 101 | 11 | 01 | −1 | 6 | 110 | 1101 |
| 101 | 11 | 10 | 0 | 7 | 000 | 1110 |
| 101 | 11 | 11 | 1 | 8 | 001 | 1111 |
| 110 | 00 | 00 | −1 | 6 | 110 | 0000 |
| 110 | 00 | 01 | 0 | 7 | 000 | 0001 |
| 110 | 00 | 10 | 1 | 8 | 001 | 0010 |
| 110 | 00 | 11 | 2 | 9 | 010 | 0011 |
| 110 | 01 | 00 | −1 | 6 | 110 | 0100 |
| 110 | 01 | 01 | 0 | 7 | 000 | 0101 |
| 110 | 01 | 10 | 1 | 8 | 001 | 0110 |
| 110 | 01 | 11 | 2 | 9 | 010 | 0111 |
| 110 | 10 | 00 | −1 | 6 | 110 | 1000 |
| 110 | 10 | 01 | 0 | 7 | 000 | 1001 |
| 110 | 10 | 10 | 1 | 8 | 001 | 1010 |
| 110 | 10 | 11 | 2 | 9 | 010 | 1011 |
| 110 | 11 | 00 | −1 | 6 | 110 | 1100 |
| 110 | 11 | 01 | 0 | 7 | 000 | 1101 |
| 110 | 11 | 10 | 1 | 8 | 001 | 1110 |
| 110 | 11 | 11 | 2 | 9 | 010 | 1111 |

As noted above, differently-sized blocks can be used if each "interleave group" comprises blocks of the same size, and if a group start number (GS), indicating the starting B_bits value for the group, is subtracted from B_bits. The resulting block number sent over the bus may need to have GS added back in. Note that there is no requirement that block numbers be consecutive, so that some of the bits of B_bits can be used to identify the interleave group.

For instance, assume that a system supports 4 sizes of DRAM cards. Assume further that hardware allows up to 16-way interleaving (requiring I=4) and up to 16 memory cards in the system. Any combination of the differently-sized memory cards can be supported at once, by assigning all cards of size A with a hexadecimal block number of 0×0?, where "?" may range from 0 to f, assigning cards of size B with a block number of 0×1?, assigning size C cards with block number 0×2?, and assigning size D cards with a block number of 0×3?. Configuration software determines the value for ? based on how many cards of that size are in the system, numbering them sequentially from 0 to the number of cards in that group. The address range for the largest size cards is then determined. Next, its GS number is set to 0. Then, for the next largest group, the same is done, beginning at the end of the previous group, and so on.

Figure 2:
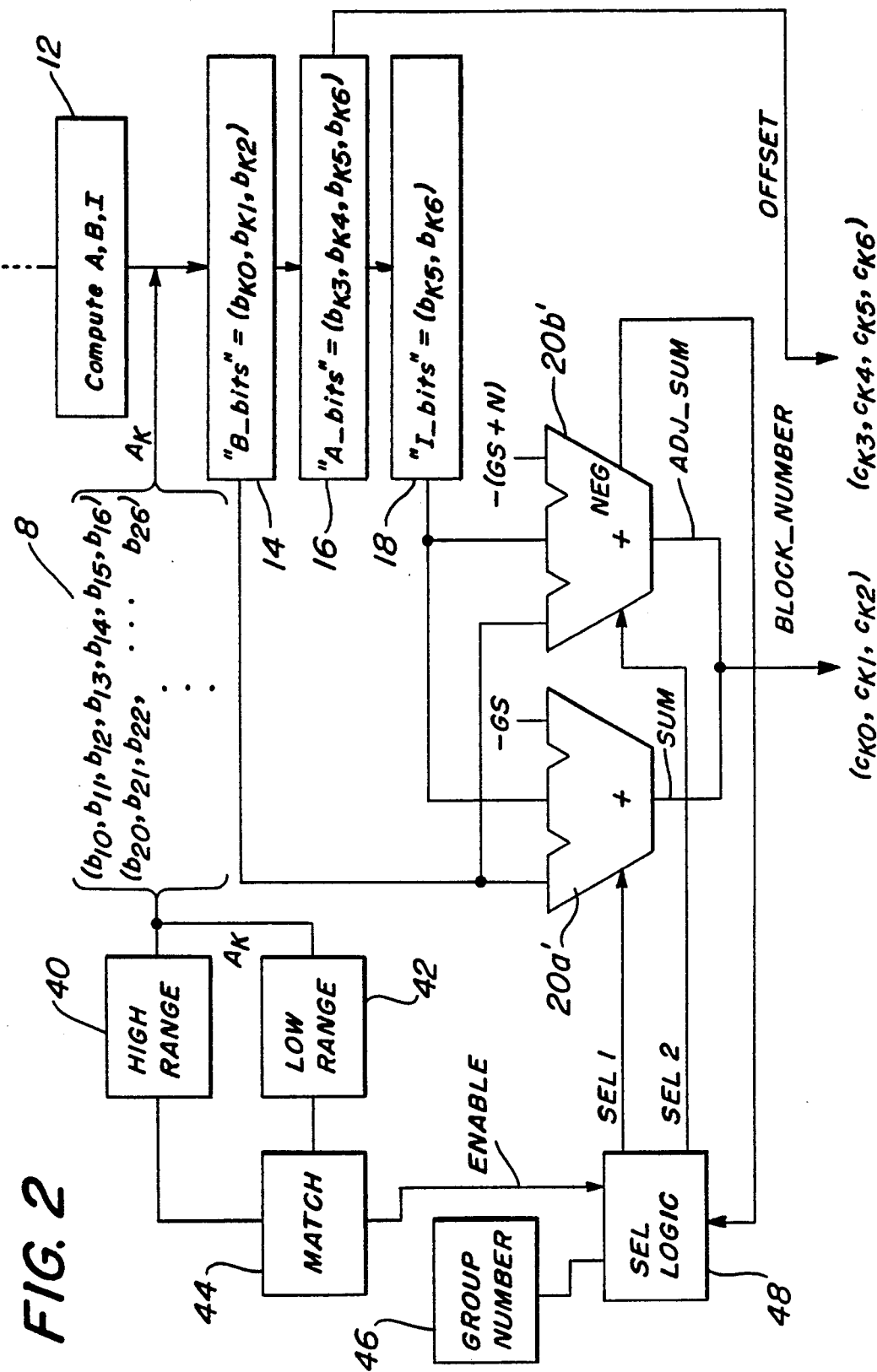
FIG. 2 is a block diagram of a restricted range modulo-N adder in accordance with the present invention.

Referring now to FIG. 2, a restricted range modulo-N adder (there is preferably one for each group of cards) in accordance with the invention comprises a pair of three term adders $20a'$, $20b'$ and means for selecting the 0 correct result, i.e., SUM or ADJ_SUM, that is between 0 and N−1. The means for selecting the correct result comprises a logic circuit 48 that provides select signals "SEL 1", "SEL 2" to the respective adders $20a'$, $20b'$. As shown in the drawing, the computations of SUM and ADJ_SUM are performed in parallel. The sign bit, denominated "NEG" in the drawing, is employed by select circuit 48 to select SUM when ADJ_SUM is less than zero, and ADJ_SUM when ADJ_SUM is zero or greater than zero. To determine the group-delineating bits (e.g., the upper two bits of B_bits), a pair of range comparators 40, 42 may be employed for each group. The outputs of comparators 40, 42 are employed by match circuit 44 which provides an enable signal ("ENABLE") to the select circuit 48. A predefined group number register 46 may also be provided to provide a group number input to select circuit 48. For many of the groups, the low range comparator 42 may be shared by the preceding group as the preceding group's high range comparator, and the high range comparator 40 may be shared by a succeeding group as the succeeding group's low range comparator.

The values −GS and −(GS+N), which are predefined constants for a given group (determined at startup), are the third inputs to the respective adders $20a'$, $20b'$. Note also that the list 8 of addresses $A_1$, $A_2$ ... $A_k$, ... is translated into a corresponding list of block numbers ("Block_No") and offset addresses within a block ("OFFSET").

Figure 3:
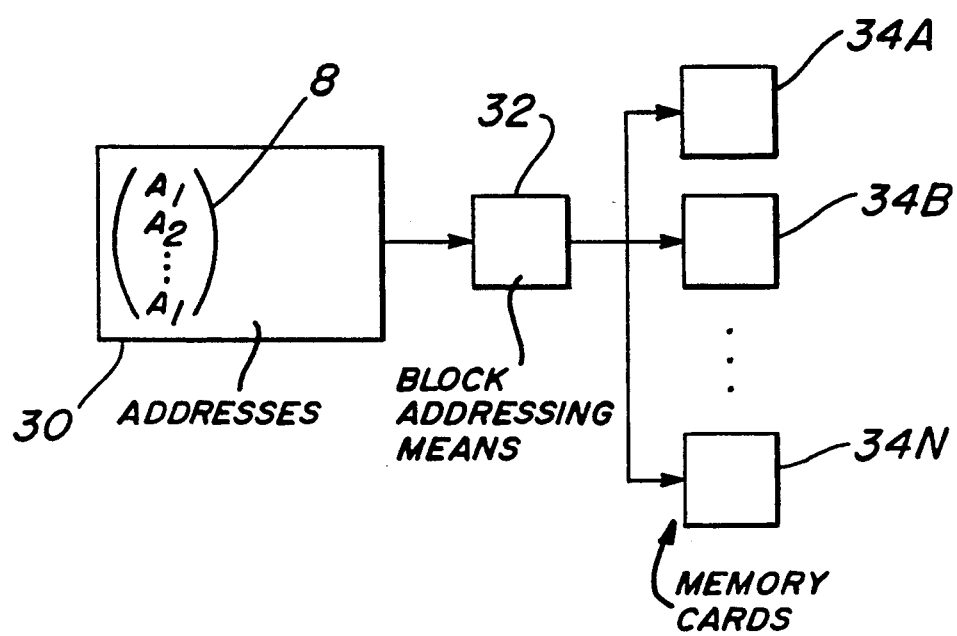
FIG. 3 is a block diagram of a computer system incorporating interleaved block memory, in accordance with the present invention.

Referring now to FIG. 3, therein a computer system according to the present invention comprises block memory 34A, 34B, ... 34N and addressing means 32 for interleaving the block memory. In a preferred embodiment, a computer 30 having an internal list 8 of addresses $A_1$, $A_2$, $A_3$ ..., is coupled to memory blocks or cards 34A-34N via addressing means 32. The addressing means 32 and/or the cards 34A-34N need not be separate devices, but can be integrated into the computer 30. The addressing means 32 comprises the code and circuitry described above for addressing the respective blocks in an interleaved fashion.

Finally, it is noted that the preferred embodiments described herein can be modified in many ways that will be apparent to those skilled in the art. For instance, the order for carrying out the steps shown in FIG. 1 can be varied, and indeed the means, (hardware or software) for carrying out the method may be embodied in a variety of devices still within the scope of the invention. In addition, the formulae employed in the preferred embodiment to compute A and I need not use the $\log_2$ function. Instead, the particular bits used for B_bits, I_bits and A_bits may be masked with appropriate bit selection logic. Thus, e.g., blocks 14, 16 and 18 of FIG. 2, for routing I_bits, B_bits, etc., to the three-term adders, could be embodied in multiplex-type logic circuitry. In addition, if a system only supports one size of memory, these paths could be hardwired. Accordingly, the scope of the invention is not to be limited by the specific embodiments described above.

What is claimed is:

1. A method of interleaving a plurality of N memory blocks of size S using translated M-bit data addresses, said memory blocks having lines of size L, and N, M, S and L being integers, the method comprising the steps:

computing the values: $A = \log_2(S)$, $B = M − A$, and $I = \mathrm{truncate}(\log_2(N))$;

defining a first group of bits (B_bits) as the B MSBs of the address being translated;

defining a second group of bits (A_bits) as the A LSBs of the address being translated;

defining a third group of bits (I_bits) as the I LSBs of A_bits after first stripping away the $\log_2(L)$ LSBs of A_bits;

computing an unadjusted sum (SUM) and an adjusted sum (ADJ_SUM) in accordance with the following definitions;

$$SUM = B\_bits + I\_bits, \quad (i)$$

and $$ADJ\_SUM = B\_bits + I\_bits - N;$$

defining a block number corresponding to the address being translated, said bock number being a function of at least one of the values of SUM or ADJ_SUM; and addressing a memory in accordance with said block number.

2. The method recited in claim 1, wherein the step of defining a block number comprises selecting as the block number the value of SUM when ADJ_SUM is less than zero, and selecting as the block number the value of ADJ_SUM when ADJ_SUM is greater than or equal to zero.

3. The method recited in claim 1, further comprising: repeating steps (a), (b), (c) and (d) for a plurality of addresses, thereby translating a list of addresses to at least a corresponding list of block numbers.

4. The method recited in claim 1, further comprising:
assigning said memory blocks to a plurality of groups, each group being identified by a number GS;
subtracting said number GS from the sums computed in said step of computing an unadjusted sum, said sums thereby being further defined as: SUM = B_bits + I_bits − BS, and ADJ_SUM = B_bits + I_bits − (N + GS);
defining an offset address corresponding to a memory location within the block represented by said block number defined in said step of defining a block number, said offset being defined by the value of A_bits; and
addressing a memory in accordance with said block number;
wherein the step of defining a block number comprises selecting as the block number the value of SUM when ADJ_SUM is less than zero, and selecting as the block number the value of ADJ_SUM when ADJ_SUM is greater than or equal to zero.

5. A method of interleaving a plurality of N memory blocks of size S using translated M-bit data addresses, said memory blocks having lines of size L, and N, M, S and L being integers, the method comprising the steps:
identifying a first group of bits (B_bits) of an address being translated;
identifying a second group of bits (I_bits) defining an interleave index corresponding to the address being translated;
assigning said memory blocks to a plurality of groups, each group being identified by a number GS;
computing an unadjusted sum (SUM) and an adjusted sum (ADJ_SUM) in accordance with the following definitions;

$$SUM = B\_bits + I\_bits - GS, \quad (i)$$

and $$ADJ\_SUM = B\_bits + I\_bits - (N + GS);$$

defining a block number corresponding to the address being translated, said block number being a function of at least one of the values of SUM or ADJ_SUM; and
addressing a memory in accordance with said block number.

6. A digital system, comprising:
(a) a computer;
(b) memory means, coupled to the computer and comprising N memory blocks of size S, N and S being integers, for storing a list of data values in associated storage locations, each storage location being identifiable by an associated M-bit address, M being an integer;
(c) addressing means for reading/writing said data values from/to said memory means in an interleaved fashion, said addressing means comprising:
(i) means for identifying a first group of bits (B_bits) of an address being translated;
(ii) means for identifying a second group of bits (I_bits) defining an interleave index corresponding to the address being translated;
(iii) means for computing an unadjusted sum (SUM) and an adjusted sum (ADJ_SUM) in accordance with the following definitions;

$$SUM = B\_bits + I\_bits,$$

and $$ADJ\_SUM = B\_bits + I\_bits - N;$$

and (iv) means for defining a block number corresponding to the address being translated, comprising means for selecting as the block number the value of SUM when ADJ_SUM is less than zero, and selecting as the block number the value of ADJ_SUM when ADJ_SUM is greater than or equal to zero;
(d) means for dividing said memory means into a plurality of groups, each group being identified by a number GS; and
(e) means for subtracting said number GS identifying each group from the sums computed by said means for computing an unadjusted sum and an adjusted sum.

7. A digital system as recited in claim 6, further comprising:
means for identifying a third group of bits (A_bits) defining an offset within the particular memory block corresponding to the address being translated.

8. A digital system, comprising:
a computer;
memory means, coupled to the computer and comprising N memory blocks of size S, N and S being integers, for storing a list of data values in associated storage locations, each storage location being identifiable by an associated M-bit address, M being an integer; and
addressing means for reading/writing said data values from/to said memory means in an interleaved fashion, sad addressing means comprising:
means for identifying a first group of bits (B_bits) of an address being translated;

means for identifying a second group of bits (I_bits) defining an interleave index corresponding to the address being translated;

means for computing an unadjusted sum (SUM) and an adjusted sum (ADJ_SUM) in accordance with the following definitions:

$SUM = B\_bits + I\_bits,$ and $ADJ\_SUM = B\_bits + I\_bits - N;$ and means for defining a block number corresponding to the address being translated, said block number being a function of at least one of the values of SUM or ADJ_SUM;

means for computing the values: $A = \log_2(S)$, $B = M - A$, and $I = \text{truncate}(\log_2(N))$;

means for defining B_bits as the B MSBs of the address being translated;

means for defining A_bits as the A LSBs of the address being translated; and means for defining I_bits as the I LSBs of A_bits after first stripping away the $\log_2(L)$ LSBs of A_bits.

9. A digital system, comprising:

(a) a computer;

(b) memory means, coupled to the computer and comprising N memory blocks of size S, N and S being integers, for storing a list of data values in associated storage locations, each storage location being identifiable by an associated M-bit address, M being an integer; and (c) addressing means for reading/writing said data values from/to said memory means in an interleaved fashion, said addressing means comprising:

(i) means for identifying a first group of bits (B_bits), comprising means for computing the values $A = \log_2(S)$, $B = M - A$, and $I = \text{truncate}(\log_2(N))$, and means for defining B_bits as the B MSBs of the address being translated;

(ii) means for identifying a second group of bits (I_bits) defining an interleave index corresponding to the address being translated, comprising means for identifying the A LSBs of the address being translated (A_bits), and means for defining I_bits as the I LSBs of A_bits after first stripping away the $\log_2(L)$ LSBs of A_bits;

(iii) means for dividing said memory means into a plurality of groups, each group being identified by a number GS;

(iv) summing means for computing an unadjusted sum (SUM) and an adjusted sum (ADJ_SUM) in accordance with the following definitions;

$SUM = B\_bits + I\_bits - GS,$ and $ADJ\_SUM = B\_bits + I\_bits - (GS + N);$ and (v) means for defining a block number corresponding to the address being translated, said block number being selected as the value of SUM when ADJ_SUM is less than zero and as the value of ADJ_SUM when ADJ_SUM is greater than or equal to zero.

* * * * *